US011888866B2

(12) United States Patent
Elend

(10) Patent No.: US 11,888,866 B2
(45) Date of Patent: Jan. 30, 2024

(54) SECURITY MODULE FOR A CAN NODE

(71) Applicant: NXP B.V., Eindhoven (NL)

(72) Inventor: Bernd Uwe Gerhard Elend, Hamburg (DE)

(73) Assignee: NXP B. V., Eindhoven (NL)

( * ) Notice: Subject to any disclaimer, the term of this patent is extended or adjusted under 35 U.S.C. 154(b) by 849 days.

(21) Appl. No.: 16/984,925

(22) Filed: Aug. 4, 2020

(65) Prior Publication Data

US 2021/0044600 A1 Feb. 11, 2021

(30) Foreign Application Priority Data

Aug. 6, 2019 (EP) .................................... 19190350

(51) Int. Cl.
| | |
|---|---|
| H04L 29/06 | (2006.01) |
| H04L 9/40 | (2022.01) |
| H04B 1/38 | (2015.01) |
| H04L 1/00 | (2006.01) |
| H04L 12/40 | (2006.01) |

(52) U.S. Cl.
CPC ........... *H04L 63/1416* (2013.01); *H04B 1/38* (2013.01); *H04L 1/0061* (2013.01); *H04L 12/40013* (2013.01); *H04L 2012/40215* (2013.01)

(58) Field of Classification Search
CPC ... H04L 63/1416; H04L 63/145; H04L 63/20; H04B 1/38
See application file for complete search history.

(56) References Cited

U.S. PATENT DOCUMENTS 9,380,070 B1 6/2016 Cain et al.
9,842,021 B2 12/2017 Halbert et al.
(Continued)

FOREIGN PATENT DOCUMENTS

CN 103475523 A 12/2013
CN 105024898 A 11/2015
(Continued)

OTHER PUBLICATIONS

Notice of Allowance dated Jun. 17, 2022 in U.S. Appl. No. 16/984,699.
(Continued)

*Primary Examiner* — Jeffrey C Pwu
*Assistant Examiner* — Thong P Truong

(57) ABSTRACT

A security module (460) for a CAN node (402). The security module (460) comprises: a RXD input interface for receiving data from a CAN bus (404), and a TXD output interface for transmitting data to the CAN bus (404). The security module (460) is configured to: receive a CAN frame from the CAN bus via the RXD input interface; compare an identifier of the received CAN frame with at least one identifier associated with a local controller (410); and upon detection of a match between the identifier of the received CAN frame and the at least one identifier associated with the local controller (410), output an error signal to the CAN bus via the TXD output interface by setting a predetermined plurality of consecutive bits (682) in the CAN frame to a dominant value. The predetermined plurality of consecutive bits (682) identifies a security error to CAN nodes connected to the CAN bus (404) and is at least 10 consecutive bits.

20 Claims, 9 Drawing Sheets

(56) References Cited

U.S. PATENT DOCUMENTS

| | | | |
|---|---|---|---|
| 10,701,102 B2 | 6/2020 | Zeng et al. | |
| 2014/0149801 A1 | 5/2014 | Jiang et al. | |
| 2015/0095711 A1 | 4/2015 | Elend | |
| 2015/0135271 A1 | 5/2015 | Forest | |
| 2015/0347218 A1 | 12/2015 | Domingues et al. | |
| 2016/0342531 A1 | 11/2016 | Sharma | |
| 2016/0344552 A1 | 11/2016 | Sharma | |
| 2016/0344703 A1 | 11/2016 | Sharma et al. | |
| 2017/0093659 A1* | 3/2017 | Elend | H04L 63/1416 |
| 2017/0235698 A1 | 8/2017 | Van Der Maas | |
| 2018/0060267 A1 | 3/2018 | Sutton et al. | |
| 2018/0152472 A1 | 5/2018 | Amano et al. | |
| 2020/0150677 A1 | 5/2020 | Walters et al. | |
| 2021/0044382 A1 | 2/2021 | Elend | |
| 2021/0044615 A1 | 2/2021 | Elend | |

FOREIGN PATENT DOCUMENTS

| | | |
|---|---|---|
| EP | 2 985 955 A1 | 2/2016 |
| EP | 3 148 154 A1 | 3/2017 |

OTHER PUBLICATIONS

Dagan, T. et al. "Parrot, a software-only anti-spoofing defense system of the CAN bus", retreived from the internet at: url:https://www.eng.tau.ac.il/yash/Parrot-escar2016.pdf, 10 pgs. (Nov. 17, 2016).

Non-Final Rejection dated Oct. 7, 2022 in U.S. Appl. No. 16/984,859.

Non-Final Rejection for U.S. Appl. No. 16/984,699, 14 pgs., (dated Sep. 15, 2021).

Notice of Allowance dated Feb. 7, 2023 in U.S. Appl. No. 16/984,859.

"CAN with Flexible Data-Rate—Specification Version 1.0", Robert Bosch, retrieved from url:https://web.archive.org/web/20151211125030lif_/http://www.bosch-semiconductors.de/media/ubk_semiconductors/pdf_1/canliterature/can_fd_spec.pdf, 34 pgs. (Apr. 17, 2012).

Matsumoto, T. et al. "A Method of Preventing Unauthorized Data Transmission in Controller Area Network", IEEE 75th Vehicular Technology Conference, 5 pgs., (2012).

\* cited by examiner

FIG. 8

|  | CRC delimiter | ACK | ACK Del | EOF 1 | EOF 2 | EOF 3 | EOF 4 | EOF 5 | EOF 6 | EOF 7 |  |  |
|---|---|---|---|---|---|---|---|---|---|---|---|---|
| Alice sends on TXD | 0 | 1 | 0 | 0 | 1 | 1 | 1 | 1 | 0 | 0 | 0 | 0 | 0 | 1 | 1 |
| Bob sends on TXD | 1 | 1 | 1 | 1 | 1 | 1 | 1 | 0 | 0 | 0 | 0 | 0 | 0 | 1 | 1 | 1 |
| Eve sends on TXD | 1 | 1 | 1 | 1 | 1 | 0 | 1 | 1 | 0 | 0 | 0 | 0 | 0 | 0 | 1 | 1 |
| All nodes see on their RXD | 0 | 1 | 0 | 0 | 1 | 0 | 1 | 0 | 0 | 0 | 0 | 0 | 0 | 0 | 1 | 1 |

FIG. 9

|  | CRC delimiter | ACK | ACK Del | EOF 1 | EOF 2 | EOF 3 | EOF 4 | EOF 5 | EOF 6 | EOF 7 |  |
|---|---|---|---|---|---|---|---|---|---|---|---|
| Alice sends on TXD | 0 | 1 | 0 | 0 | 1 | 1 | 1 | 1 | 1 | 0 | 0 | 0 | 0 | 0 | 1 |
| Bob sends on TXD | 1 | 1 | 1 | 1 | 1 | 1 | 1 | 1 | 0 | 0 | 0 | 0 | 0 | 1 | 1 |
| Eve sends on TXD | 1 | 1 | 1 | 1 | 1 | 0 | 1 | 1 | 1 | 0 | 0 | 0 | 0 | 0 | 1 |
| All nodes see on their RXD | 0 | 1 | 0 | 0 | 1 | 0 | 1 | 1 | 0 | 0 | 0 | 0 | 0 | 1 |

FIG. 12

|  |  |  |  |  |  |  | Data | Data | Data | Data | Data |  |  |  |  |  |  |
|---|---|---|---|---|---|---|---|---|---|---|---|---|---|---|---|---|---|
| Alice sends on TXD | 1 | 0 | 0 | 0 | 0 | 0 | [1] | 1 | 1 | 1 | 1 | 1 | 0 | 0 | 0 | 0 | 0 | 1 |
| Bob sends on TXD | 1 | 1 | 1 | 1 | 1 | 1 | 1 | 0 | 0 | 0 | 0 | 0 | 1 | 1 | 1 | 1 | 1 | 1 |
| Eve sends on TXD | 1 | 1 | 1 | 1 | 1 | 1 | 1 | 1 | 1 | 1 | 1 | 1 | 0 | 0 | 0 | 0 | 0 | 1 |
|  |  |  |  |  |  |  |  |  |  |  |  |  |  |  |  |  |  |  |
| RXD Bob | 1 | 0 | 0 | 0 | 0 | 0 | 0 | 0 | 0 | 0 | 0 | 0 | 0 | 0 | 0 | 0 | 0 | 1 |
| RXD Alice and Eve | 1 | 0 | 0 | 0 | 0 | 0 | 1 | 0 | 0 | 0 | 0 | 0 | 0 | 0 | 0 | 0 | 0 | 1 |

FIG. 13

|  |  |  |  |  |  |  | CRC delimiter | ACK | ACK Del | EOF 1 | EOF 2 | EOF 3 | EOF 4 | EOF 5 | EOF 6 |  |
|---|---|---|---|---|---|---|---|---|---|---|---|---|---|---|---|---|
| Alice sends on TXD | 1 | 0 | 0 | 0 | 0 | 0 | [1] | 0 | 1 | 0 | 0 | 0 | 0 | 0 | 0 | 1 | 1 |
| Bob sends on TXD | 1 | 1 | 1 | 1 | 1 | 1 | 1 | 0 | 0 | 0 | 0 | 0 | 0 | 1 | 1 | 1 | 1 |
| Eve sends on TXD | 1 | 1 | 1 | 1 | 1 | 1 | 1 | 0 | 1 | 0 | 0 | 0 | 0 | 0 | 0 | 1 | 1 |
|  |  |  |  |  |  |  |  |  |  |  |  |  |  |  |  |  |  |
| RXD Bob | 1 | 0 | 0 | 0 | 0 | 0 | 0 | 0 | 0 | 0 | 0 | 0 | 0 | 0 | 0 | 1 | 1 |
| RXD Alice and Eve | 1 | 0 | 0 | 0 | 0 | 0 | 1 | 0 | 0 | 0 | 0 | 0 | 0 | 0 | 0 | 1 | 1 |

FIG. 14

|  |  | | | | | | | CRC delimiter | ACK | ACK 2 | ACK Del | EOF 1 | EOF 2 | EOF 3 | EOF 4 | EOF 5 | EOF 6 | |
|---|---|---|---|---|---|---|---|---|---|---|---|---|---|---|---|---|---|---|
| Alice | sends on TXD | 1 | 0 | 0 | 0 | 0 | 0 | 1 | 1 | 1 | 1 | 0 | 0 | 0 | 0 | 0 | 0 | 1 |
| Bob | sends on TXD | 1 | 1 | 1 | 1 | 1 | 1 | 1 | 0 | 0 | 0 | 0 | 0 | 0 | 1 | 1 | 1 | 1 |
| Eve | sends on TXD | 1 | 1 | 1 | 1 | 1 | 1 | 1 | 1 | 1 | 1 | 0 | 0 | 0 | 0 | 0 | 0 | 1 |
| RXD Bob |  | 1 | 0 | 0 | 0 | 0 | 0 | 0 | 0 | 0 | 0 | 0 | 0 | 0 | 0 | 0 | 0 | 1 |
| RXD Alice and Eve |  | 1 | 0 | 0 | 0 | 0 | 0 | 1 | 0 | 0 | 0 | 0 | 0 | 0 | 0 | 0 | 0 | 1 |

FIG. 15

|  |  | | | | | CRC delimiter | ACK | ACK Del | EOF 1 | EOF 2 | EOF 3 | EOF 4 | EOF 5 | EOF 6 | EOF 7 | | |
|---|---|---|---|---|---|---|---|---|---|---|---|---|---|---|---|---|---|
| Alice | sends on TXD | 1 | 1 | 1 | 1 | 1 | 0 | 0 | 0 | 0 | 0 | 0 | 0 | 0 | 0 | 0 | 1 | 1 |
| Bob | sends on TXD | 1 | 1 | 1 | 1 | 1 | 0 | 1 | 0 | 0 | 0 | 0 | 0 | 0 | 1 | 1 | 1 | 1 |
| Eve | sends on TXD | 0 | 1 | 0 | 0 | 1 | 1 | 1 | 0 | 0 | 0 | 0 | 0 | 0 | 1 | 1 | 1 | 1 |
| All nodes see on their RXD |  | 0 | 1 | 0 | 0 | 1 | 0 | 0 | 0 | 0 | 0 | 0 | 0 | 0 | 0 | 0 | 1 | 1 |

SECURITY MODULE FOR A CAN NODE

CROSS-REFERENCE TO RELATED APPLICATIONS

This application claims the priority under 35 U.S.C. § 119 of European patent application no. 19190350.9, filed on Aug. 6, 2019, the contents of which are incorporated by reference herein.

FIELD

The present disclosure relates to security in controller area networks.

BACKGROUND

Controller area network (CAN) bus is a message-based communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The data link layer of the CAN protocol is standardized as International Standards Organization (ISO) 11898-1. The standardized CAN data link layer protocol has also been extended to provide higher data rates. The extended protocol, referred to as CAN Flexible Data-Rate or "CAN FD," is part of the ISO 11898-1:2015 version of the standard. A next generation CAN protocol termed CAN XL is also under development.

One growing concern with in-vehicle networks, such as in-vehicle networks that use the CAN bus protocol, is network security, including intrusion detection and intrusion prevention. For example, a compromised in-vehicle network could allow an attacker to maliciously control components of a vehicle.

SUMMARY

According to a first aspect of the present disclosure there is provided a security module for a controller area network, CAN, node, the security module comprising:
  a receive data, RXD, input interface for receiving data from a CAN bus;
  a transmit data, TXD, output interface for transmitting data to the CAN bus;
  wherein the security module is configured to:
    receive a CAN frame from the CAN bus via the RXD input interface;
    compare an identifier of the received CAN frame with at least one identifier associated with a local controller; and
    upon detection of a match between the identifier of the received CAN frame and the at least one identifier associated with the local controller, output an error signal to the CAN bus via the TXD output interface by setting a predetermined plurality of consecutive bits in the CAN frame to a dominant value, wherein the predetermined plurality of consecutive bits identifies a security error to CAN nodes connected to the CAN bus and is at least 10 consecutive bits.

Such a security module can advantageously alert other CAN nodes that the CAN network is under attack at the same time as it invalidates, destroys, and/or kills a malicious CAN message. Using at least 10 consecutive dominant bits can distinguish from error flags that have 6 bits, as defined by the 11898-1 standard.

In one or more embodiments, the predetermined plurality of consecutive bits identifies a security error to CAN nodes connected to the CAN bus by having a length different to any length of consecutive dominant bits that can arise on the CAN bus due to a form error.

In one or more embodiments, the predetermined plurality of consecutive bits is at most 15 consecutive bits.

In one or more embodiments, the predetermined plurality of consecutive bits is one of:
  10 consecutive bits;
  11 consecutive bits; or
  13 consecutive bits.

In one or more embodiments, the predetermined plurality of consecutive bits is one of:
  16 consecutive bits;
  17 consecutive bits;
  19 consecutive bits; or
  more than 19 consecutive bits.

In one or more embodiments, the security module is configured to set the predetermined plurality of consecutive bits such that a first of the predetermined plurality of consecutive bits occurs after a CRC delimiter bit of the received CAN frame.

In one or more embodiments, the security module is configured to set the predetermined plurality of consecutive bits such that a first of the predetermined plurality of consecutive bits corresponds to an acknowledge bit of the received CAN frame.

There is also provided a CAN node comprising:
  a CAN transceiver;
  the local controller; and
  any security module disclosed herein.

The RXD input interface and TXD output interface of the security module may be configured to communicate with the CAN bus via the CAN transceiver. The security module may be located on a data path between the CAN transceiver and the local controller.

In one or more embodiments, the security module is configured to pass through the received CAN frame to the local CAN controller. The local CAN controller may be configured to determine the validity of the received CAN frame based on consecutive dominant bits in the received CAN frame.

In one or more embodiments, the CAN node is configured to determine that the received CAN frame is invalid due to:
  a violation of a security policy if a number of consecutive dominant bits in the received CAN frame is equal to the predetermined number of consecutive bits in the plurality of consecutive bits; or
  a non-security error if the number of consecutive dominant bits in the received CAN frame is not equal to the predetermined number of consecutive bits in the plurality of consecutive bits.

In one or more embodiments, the CAN node comprises a measurement module configured to measure the number of consecutive dominant bits in the CAN frame.

In one or more embodiments, the measurement module comprises: a timer module; or a capture and compare module.

In one or more embodiments, the measurement module is configured to measure the number of consecutive dominant bits in the CAN frame by measuring a pulse length corresponding to a pulse defined by the consecutive dominant bits.

In one or more embodiments, the measurement module is configured to start measuring a pulse length when a signal level on the TXD output interface and a signal level on the RXD input interface are both dominant.

According to a further aspect of the invention there is provided a method for outputting an error signal to a controller area network, CAN, bus, the method comprising:
receiving a CAN frame from a CAN bus;
comparing an identifier of the received CAN frame with at least one identifier associated with a local controller;
detecting a match between the identifier of the received CAN frame and the at least one identifier associated with the local controller; and
outputting an error signal to the CAN bus by setting a predetermined plurality of consecutive bits in the CAN frame to a dominant value, wherein the predetermined plurality of consecutive bits identifies a security error to CAN nodes connected to the CAN bus and is at least 10 consecutive bits.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which:

FIG. 8 illustrates an example standard CRC error in a classical CAN network;
FIG. 9 illustrates an example standard CRC error in a CAN FD network;
FIG. 12 illustrates an example standard stuff error in a classical CAN or CAN FD network;
FIG. 13 illustrates an example CRC delimiter error in a classical CAN network;
FIG. 14 illustrates an example CRC delimiter error in a CAN FD network;
and
FIG. 15 illustrates an example security error flag in a CAN network.

DETAILED DESCRIPTION

Figure 1:
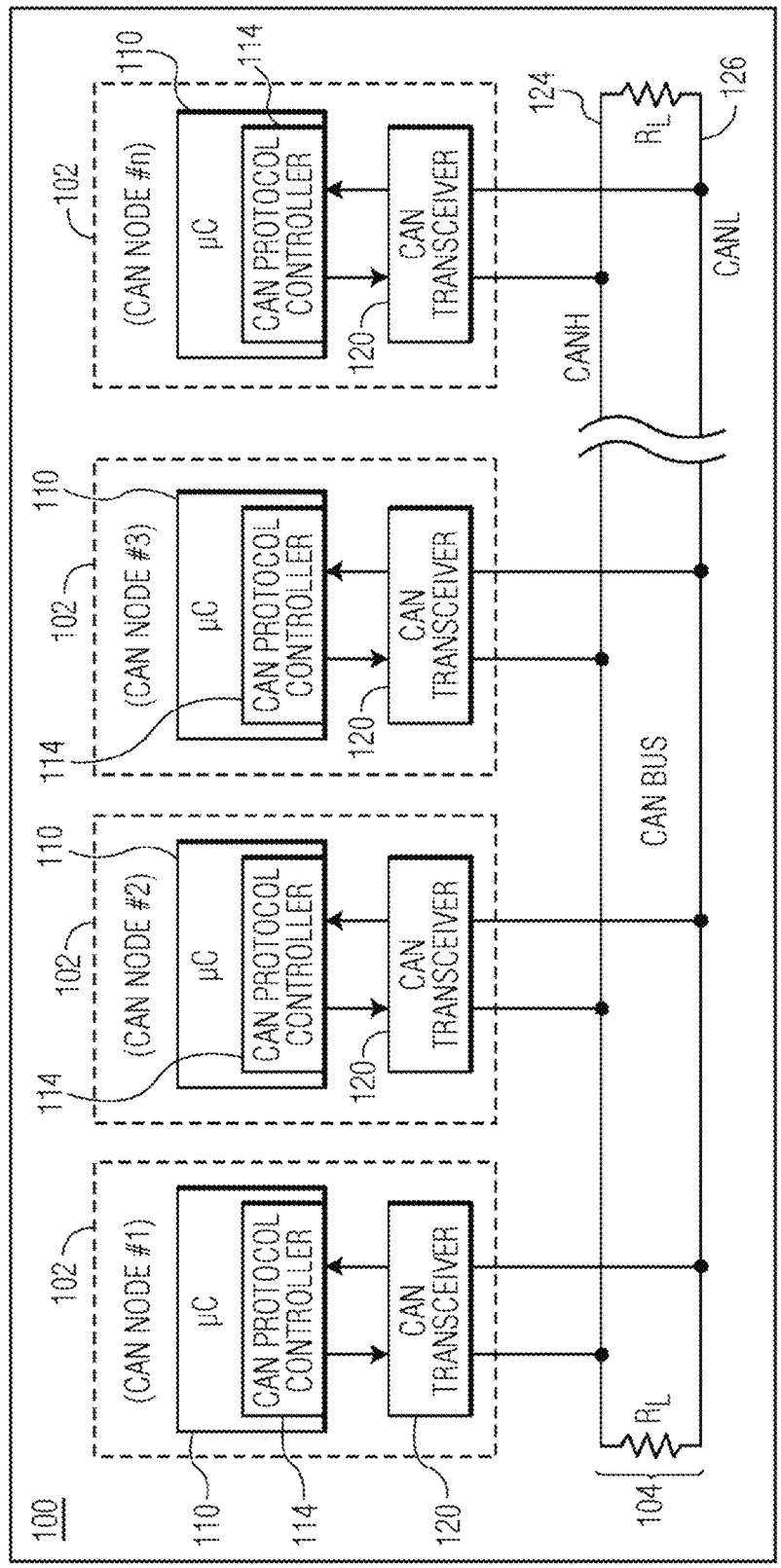
FIG. 1 shows a CAN network.

FIG. 1 depicts a CAN network 100 that includes multiple CAN nodes 102, also referred to as ECUs, each connected to a CAN bus 104. In the embodiment of FIG. 1, each CAN node 102 includes a local controller 110, or microcontroller, having an embedded CAN protocol controller 114, and a CAN transceiver 120. The local controllers 110 are typically connected to at least one device (not shown) such as a sensor, an actuator, or some other control device and are programmed to determine the meaning of received messages and to generate appropriate outgoing messages. The local controllers may also be referred to as host processors, hosts, or digital signal processors (DSPs). In some examples, the host supports application software that interacts with the CAN protocol controller 114.

The CAN protocol controllers 114, which can be embedded within the local controllers 110 or external to the local controllers (e.g., a separate IC device), implement data link layer operations. For example, in receive operations, a CAN protocol controller 114 stores received serial bits from the transceiver 120 until an entire message is available for fetching by the local controller 110. The CAN protocol controller 114 can also decode CAN messages according to the standardized frame formats of the CAN protocol. In transmit operations, the CAN protocol controller 114 receives messages from the local controller and transmits the messages as serial bits in one of the CAN frame formats to the CAN transceiver 120.

The CAN transceivers 120 are located between the CAN protocol controllers 114 and the CAN bus 104 and implement physical layer operations. For example, in receive operations, a CAN transceiver 120 converts analog differential signals from the CAN bus to serial digital signals that the CAN protocol controller 114 can interpret. The CAN transceiver also protects the CAN protocol controller 114 from extreme electrical conditions on the CAN bus 104, e.g., electrical surges. In transmit operations, the CAN transceiver 120 converts serial digital bits received from the CAN protocol controller 114 into analog differential signals that are sent on the CAN bus 104.

The CAN bus 104 carries analog differential signals and includes a CAN high (CANH) bus line 124 and a CAN low (CANL) bus line 126.

Figure 2:
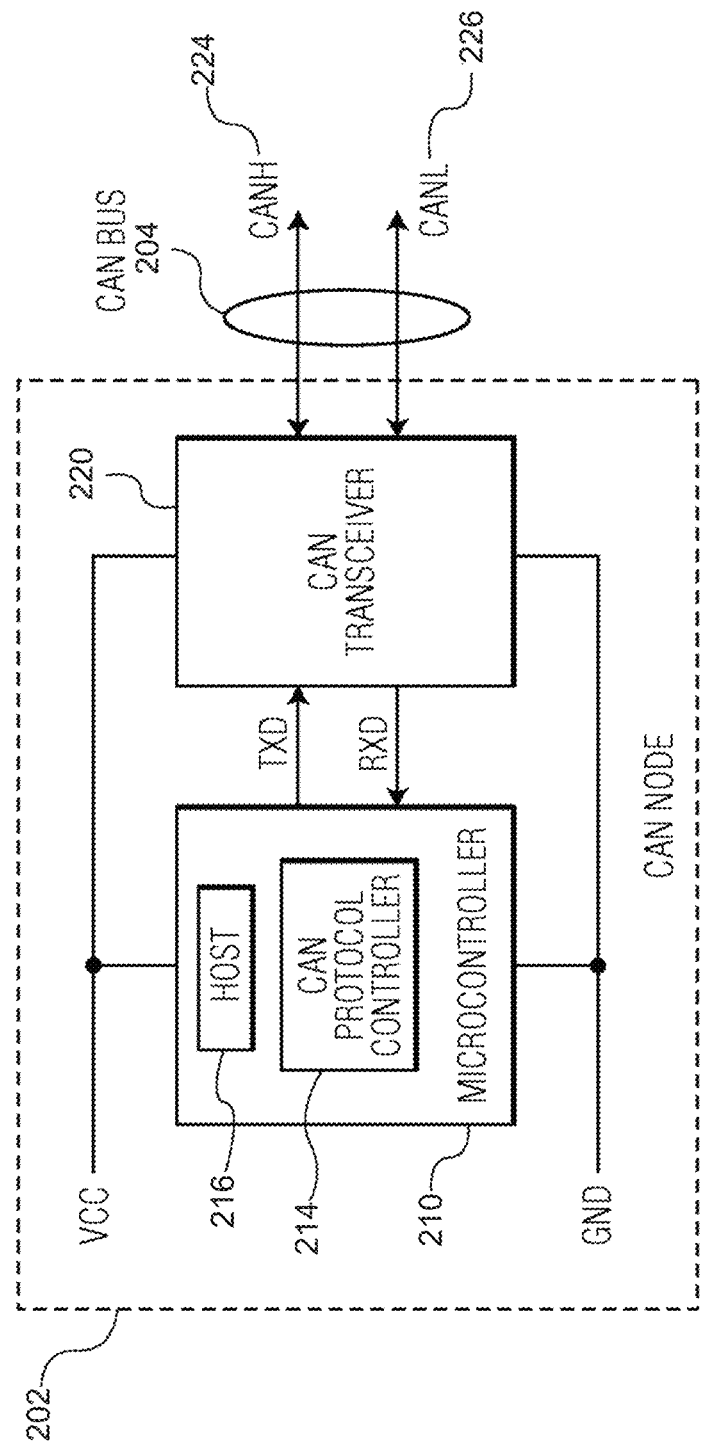
FIG. 2 shows an expanded view of a CAN node.

FIG. 2 depicts an expanded view of one CAN node 202. Features of FIG. 2 that are also shown in FIG. 1 have been given corresponding reference numbers in the 200 series and will not necessarily be described again here.

The local controller 210 includes a host 216, which may be, for example, a software application that is stored in memory of the local controller 210 and executed by processing circuits of the local controller 210. The local controller 210 and the CAN transceiver 220 of the CAN node 202 are connected between a supply voltage, Vcc, and ground, GND. In some examples, the local controller 210 and the CAN transceiver 220 may have different supply voltages. As illustrated in FIG. 2, data communicated from the local controller 210 to the CAN transceiver 220 is identified as transmit data (TXD) and data communicated from the CAN transceiver 220 to the local controller 210 is referred to as receive data (RXD). Data is communicated to and from the CAN bus via the CANH and CANL bus lines 224 and 226, respectively.

Figure 3:
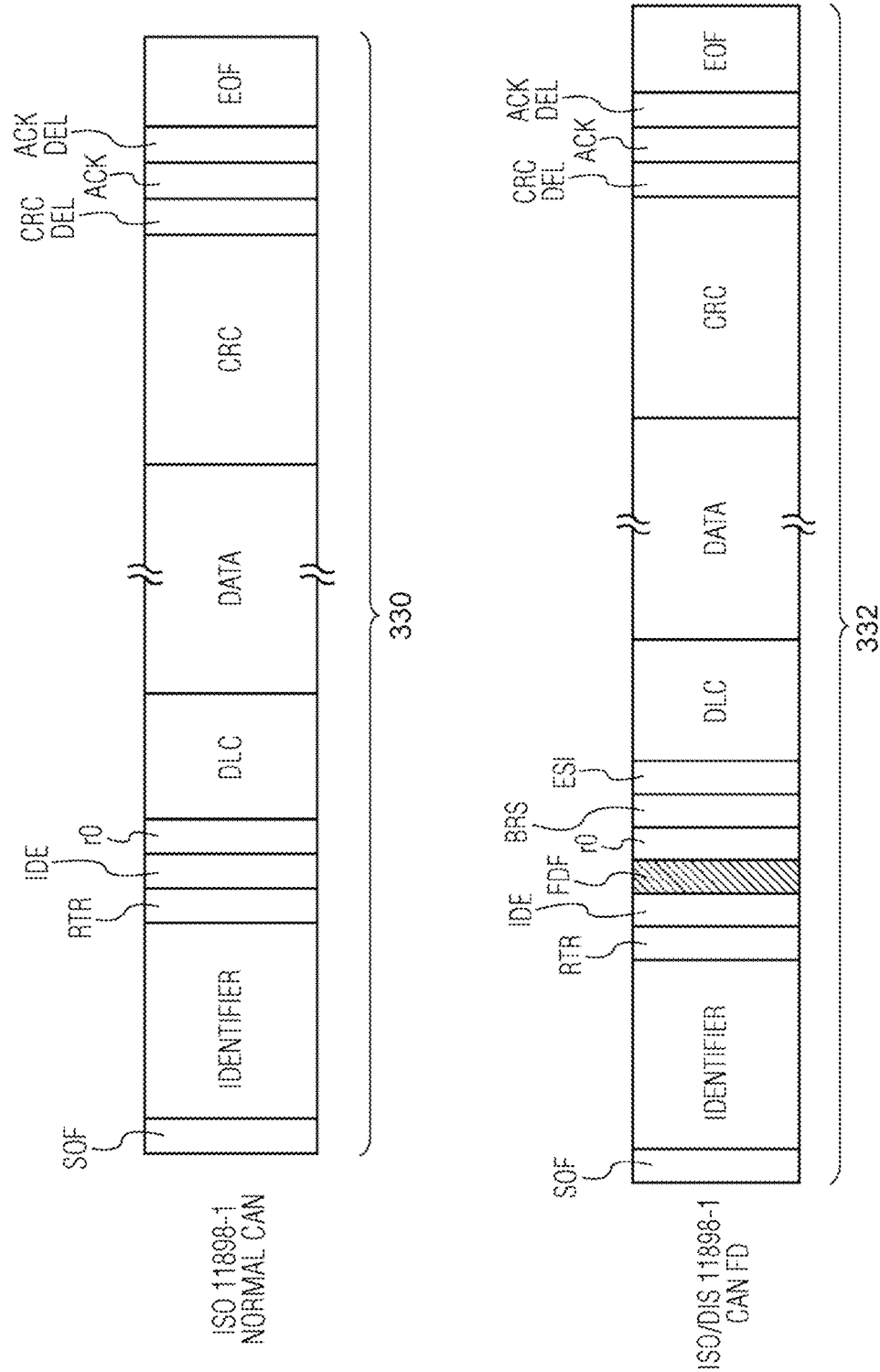
FIG. 3 shows a Classical CAN frame and a CAN FD frame in base frame format.

FIG. 3 depicts the format of an ISO 11898-1 frame 330 (in the classical base frame format (CBFF) or standard format) that is used in CAN normal mode and also the format of an ISO/DIS 11898-1 frame 332 (in the FD base frame format or FBFF) that is used in CAN FD mode. The fields of the CAN normal mode and CAN FD mode frames are defined as follows:
- SOF: Start of Frame (always dominant)
- IDENTIFIER: Identifier Bits, defining the message content
- RTR: Remote transmission Request
- IDE: ID Extension
- R0: Reserved Bit 0 (replaced by FDF in the CAN FD format)
- FDF: FD Format (this is the bit distinguishing the frame formats)
- BRS: Baud Rate Switch
- ESI: Error State Indicator
- DLC: Data Length Code
- Data: Data Bytes
- CRC: Cyclic Redundancy Check
- CRC Del: CRC Delimiter (always recessive)
- ACK: Acknowledge
- ACK Del: Acknowledge Delimiter
- EOF: End Of Frame There is also another version of the classical frame format, referred to as "classical extended frame format (CEFF)," in which the FDF bit is in the old r1 position, whereas the FDF bit is in the r0 position in CBFF. There is also a "FD extended frame format (FEFF)," where "extended" refers to a 29-bit identifier. Of note, the CAN protocols use the reserved bit (r0 or r1) (also referred to generally as the FDF bit) within a CAN frame to identify a frame as a CAN FD mode frame. In particular, the FDF bit is a 1-bit field that indicates whether the frame is a CAN normal mode frame or a CAN FD mode frame. When the FDF bit is dominant (e.g., low or "0"), the frame is a CAN normal mode frame and when the FDF bit is recessive (e.g., high or "1"), the frame is a CAN FD mode frame. In a CAN normal mode frame, the reserved bits (r0, r1) are always driven dominant to the bus lines.

CAN messages are broadcast messages and the identifier is unique to the sender CAN node. The CAN protocol controllers of the receiving CAN nodes have identifier filters that are "tuned" to certain identifiers to make sure that the host receives relevant messages and is not bothered with irrelevant messages. Standard CAN frames have an 11-bit IDENTIFIER field to carry an 11-bit identifier and extended CAN frames have a 29-bit IDENTIFIER field to carry a 29-bit identifier. The 29-bit IDENTIFIER field is divided into two sections, an 11-bit base IDENTIFIER field and an 18-bit extended IDENTIFIER field.

As stated above, security is a growing concern with in-vehicle networks. Many of the components of an in-vehicle network utilize software that must periodically be updated. In order to update software, in-vehicle networks often have "back door" access ports. If a back door access port is hacked, elements in the in-vehicle network can be compromised. One known attack technique on an in-vehicle network that uses the CAN protocol involves an attacker sending error flags to disturb frames that start with a certain identifier, which may cause the legitimate sending CAN node of this certain identifier to go into a "bus off" state. While the legitimate CAN node is recovering from the bus off state, the attacker can send CAN messages (e.g., "data frames", which are CAN frames with the RTR bit set to "0") with the identifier that is normally used by the sending CAN node. The suspicious CAN messages may be received by CAN nodes on the CAN bus and recognized as valid messages because the identifier has previously been used within the CAN network. Thus there are spoofed messages on the CAN bus. Once received by a CAN node on the CAN bus, the suspicious messages can be used to implement malicious activity within the receiving CAN node.

To detect and prevent such an attack on the CAN network a CAN node can be configured to store the identifier of a CAN message that is being sent by the CAN node itself and further configured to compare the identifiers of incoming CAN messages to the stored identifier to determine if any incoming CAN messages have a matching identifier. Since identifiers are typically uniquely assigned to each CAN node, if a received identifier matches a stored identifier, the receiving CAN node can assume that the CAN message is from an intruder and can take an action to prevent the intrusion. For example, in response to detecting a match between a received identifier and a stored identifier, the CAN node can be configured to immediately send an error signal such as an error flag onto the CAN bus to prevent the malicious CAN message from being successfully and completely received by any CAN nodes on the CAN bus, e.g., to invalidate, destroy, and/or kill the CAN message. Applying such a technique, only the original (or legitimate) CAN node that uses a particular identifier can send CAN messages with that identifier without the CAN messages being invalidated, destroyed, and/or killed.

Figure 4A:
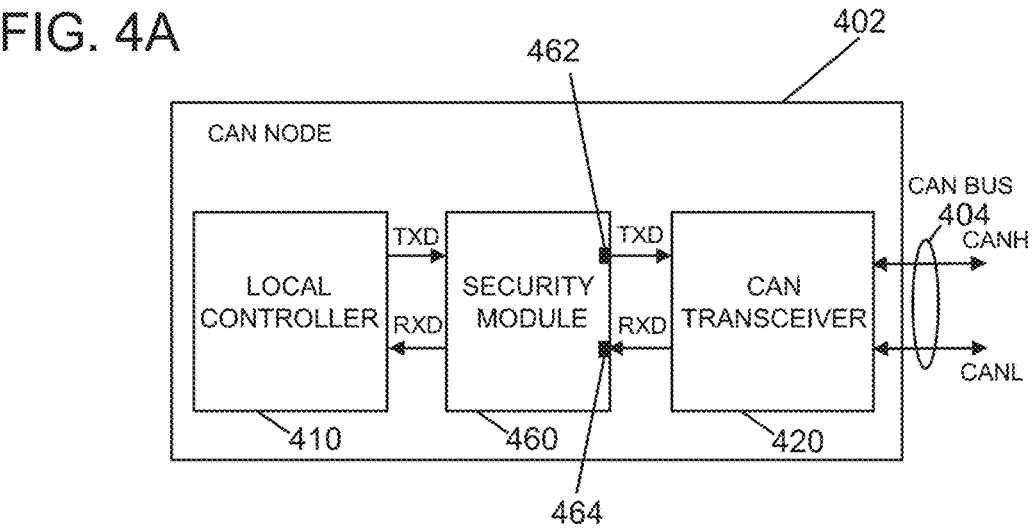
FIG. 4A shows a CAN node including a security module according to an embodiment of the disclosure.

FIG. 4A depicts a CAN node 402 including a security module 460 according to an embodiment of the present disclosure. In this embodiment, the security module 460 is provided separately to a CAN transceiver 420 and a CAN local controller 410. The security module 460 is located in a data path between the CAN transceiver 420 and the CAN local controller 410.

Figure 4B:
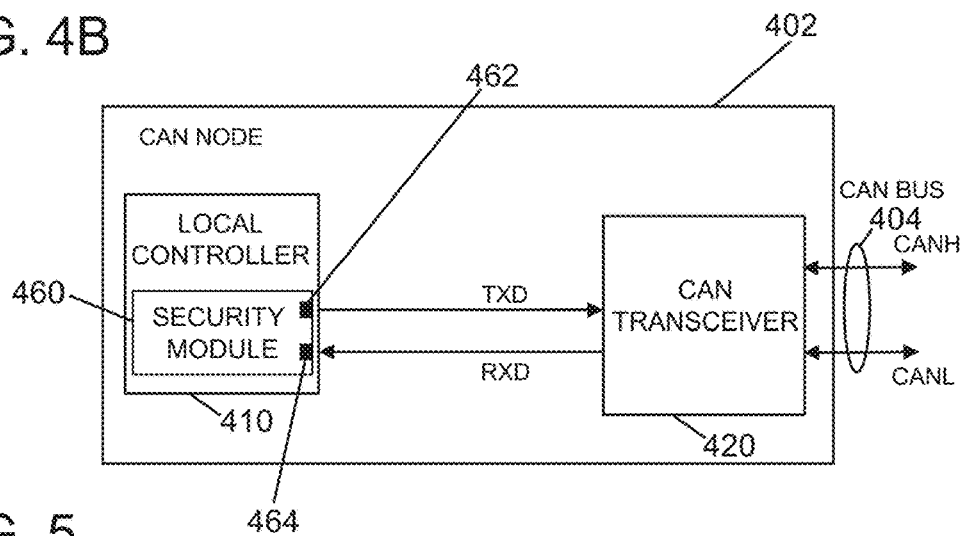
FIG. 4B shows a CAN node including another security module according to an embodiment of the disclosure.

FIG. 4B depicts a CAN node 402 including a security module 460 according to another embodiment of the present disclosure. In this embodiment, the security module 460 is provided as part of the CAN local controller 410. For instance, the functionality of the security module 460 can be provided by a CAN protocol controller.

In a further still embodiment, the functionality of the security module 460 can be provided by the CAN transceiver 420.

The security module 460 is configured to implement the above-described intrusion detection/prevention technique in a way that enables CAN nodes on the CAN bus to identify that the CAN network is under attack. The CAN node 402 includes a CAN transceiver 420 and a CAN local controller 410 as described above with reference to FIGS. 1 and 2. The security module 460 to pass through a received CAN frame to the CAN local controller 410, preferably with no/minimal latency added and without any kind of buffering.

It will be appreciated that examples disclosed herein can relate to a Classical CAN node, a CAN FD node, a CAN XL node, or any other CAN node that satisfies an associated CAN standard, either now or in the future.

The security module 434 includes a receive data, RXD, input interface 436 for receiving data from the CAN bus 404. The security module 434 also includes a transmit data, TXD, output interface 438 for transmitting data to the CAN bus 404.

The security module 460 is configured to decode an identifier of a CAN message that is received on the CAN bus 404 (e.g., CAN messages on the RXD path) and to compare the identifier of the CAN message to a list of local identifiers associated with the CAN node 402. The list may include one or more local identifiers. The security module 460 is located such that the comparison can take place before the CAN message is completely received at the CAN local controller 410. If the CAN message identifier matches the local identifier the CAN node 402 is considered a CAN node under attack. If the comparison indicates that the identifier from the CAN message matches one of the local identifiers (and assuming the CAN node 402 is not transmitting the CAN message itself) the security module 460 outputs an error signal to the CAN bus by setting a predetermined plurality of consecutive bits of the CAN message to a dominant value, wherein the plurality is at least consecutive bits. The plurality of at least 10 consecutive dominant bits identifies a security error to CAN nodes connected to the CAN bus. Using at least 10 consecutive dominant bits distinguishes from error flags that have 6 bits, as defined by the 11898-1 standard. In this way, the security module 460 alerts other CAN nodes that the CAN network is under attack at the same time as it invalidates, destroys, and/or kills the malicious CAN message.

The CAN nodes coupled to the CAN bus 404 respond to the error flag or invalidation flag by discarding the CAN message without processing the message or examining its payload at their respective local controllers. This can prevent the CAN message from implementing any malicious activity within the CAN node 402 under attack and/or within other CAN nodes in the CAN network.

By setting a predetermined plurality of at least 10 consecutive bits to a dominant value, CAN nodes connected to the CAN bus 404 can identify a security attack on the CAN network without examining the payload of the malicious CAN message.

The predetermined plurality of consecutive dominant bits is at least 10 consecutive bits and can have a length that is different to any length of consecutive dominant bits that can arise on the CAN bus 404 due to a stuff or form error, for example. In this way, the CAN nodes can distinguish between: a) a security attack because they receive an error flag that contains the predetermined number (which is at least 10) of consecutive dominant bits; and b) a form error, which is represented by a different error flag. The predetermined plurality of consecutive dominant bits enables the CAN node 402 under attack and other remote CAN nodes on the CAN network to: (i) determine that the CAN network is under attack; and (ii) potentially take any remedial action.

The length of the plurality of consecutive dominant bits identifies a security error to CAN nodes receiving data from the CAN bus 404. The choice of length can be best understood from the following series of non-security related error examples in a CAN network utilising the standard error handling approach of CAN or CAN FD. Each scenario considers three CAN nodes named Alice, Bob and Eve communicating over the same CAN network.

Example 1— Standard CRC Error in a Classical CAN Network

Reference is made to FIG. 8 indicating the bits sent by each node to the CAN bus via their TXD path and received from the CAN bus via their RXD path.

In this first example, Bob detects a CRC error (not illustrated in the table) and sends an error flag consisting of 6 dominant bits to the CAN bus. The error is flagged after the ACK Del bit beginning at EOF-1. A 6-bit error flag is a standard form error flag defined by ISO 11898-1.

Alice and Eve receive EOF-1 from the CAN bus as a dominant bit, which they would expect to receive as a recessive bit under normal operation. As a result, they send their own 6-bit error flag to the CAN bus beginning at the next bit time, EOF-2.

The resultant error on the CAN bus consists of 7 consecutive dominant bits.

Example 2— Standard CRC Error in a CAN FD Network

Reference is made to FIG. 9 indicating the bits sent by each node to the CAN bus via their TXD path and received from the CAN bus via their RXD path.

In this example, Bob again detects a CRC error (not illustrated in the table) and sends an error flag consisting of 6 dominant bits to the CAN bus. A 6-bit error is flagged three bits after the CRC Del bit beginning at EOF-2, in accordance with ISO 11898-1.

Alice and Eve receive EOF-2 from the CAN bus as a dominant bit, which they would expect to receive as a recessive bit under normal operation. As a result, they send their own 6-bit error flag to the CAN bus beginning at the next bit time, EOF-3.

The resultant error on the CAN bus consists of 7 consecutive dominant bits.

Example 3— Standard CRC Error in a CAN FD Network with Distortion

Figure 10:
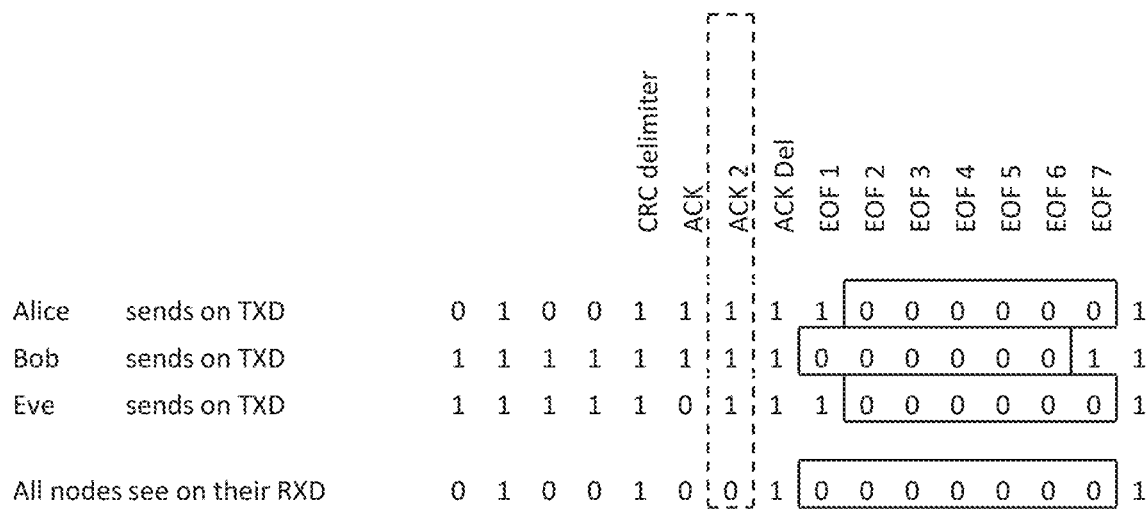
FIG. 10 illustrates an example standard CRC error in a CAN FD network with distortion.

Reference is made to FIG. 10 indicating the bits sent by each node to the CAN bus via their TXD path and received from the CAN bus via their RXD path.

In this example, Bob again detects a CRC error (not illustrated in the table) and sends an error flag consisting of 6 dominant bits to the CAN bus. A 6-bit error is flagged three bits after the CRC Del bit in accordance with ISO 11898-1. However, due to a distortion, all nodes see a prolonged ACK and add an ACK-2 bit into their decoding process. As a result, bob's 6-bit error flag begins at EOF-1.

Alice and Eve receive EOF-1 from the CAN bus as a dominant bit, which they would expect to receive as a recessive bit under normal operation. As a result, they send their own 6-bit error flag to the CAN bus beginning at the next bit time, EOF-2.

The resultant error on the CAN bus again consists of 7 consecutive dominant bits.

Example 4— Standard CRC Error in a CAN FD Network with CRC Distortion

Figure 11:
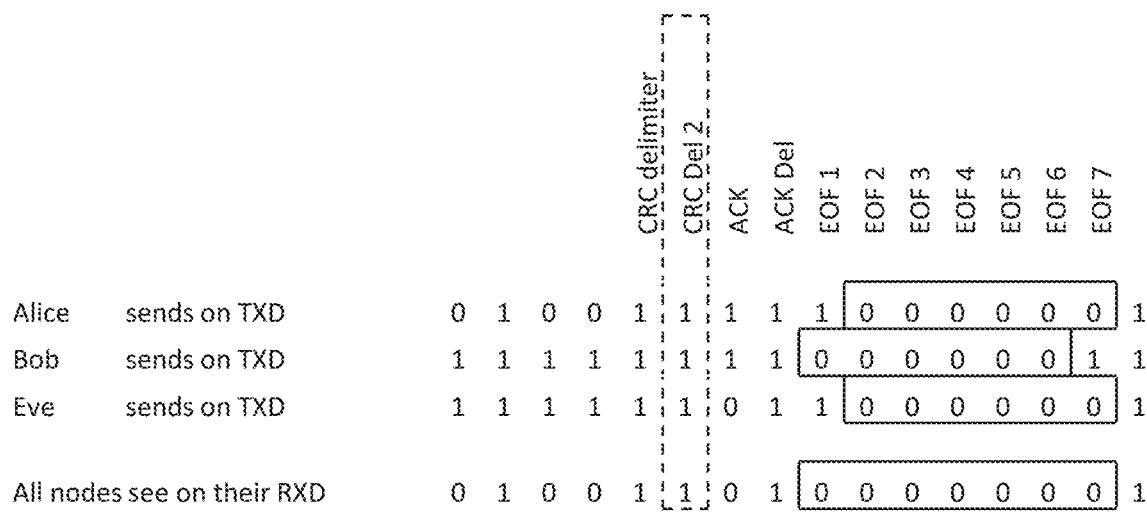
FIG. 11 illustrates an example standard CRC error in a CAN FD network with CRC distortion.

Reference is made to FIG. 11 indicating the bits sent by each node to the CAN bus via their TXD path and received from the CAN bus via their RXD path.

In this example, Bob again detects a CRC error (not illustrated in the table) and sends an error flag consisting of 6 dominant bits to the CAN bus. A 6-bit error is flagged three bits after the CRC Del bit in accordance with ISO 11898-1. However, due to a distortion, all nodes see a prolonged CRC del bit and add an CRC Del-2 bit into their decoding process. As a result, bob's 6-bit error flag begins at EOF-1.

Alice and Eve receive EOF-1 from the CAN bus as a dominant bit, which they would expect to receive as a recessive bit under normal operation. As a result, they send their own 6-bit error flag to the CAN bus beginning at the next bit time, EOF-2.

The resultant error on the CAN bus again consists of 7 consecutive dominant bits.

Example 5— Standard Stuff Error in a Classical CAN or CAN FD Network

Reference is made to FIG. 12 indicating the bits sent by each node to the CAN bus via their TXD path and received from the CAN bus via their RXD path.

In this example, Bob detects a stuff error (6 consecutive dominant bits) due to a distortion. Note that the seventh bit in the table was sent by all nodes as recessive, yet BOB received a dominant bit. Following detection of the stuff error, Bob sends a 6-bit error flag in accordance with ISO 11898-1.

Alice and Eve receive Bob's 6-bit error flag and interpret it as a stuff error. Therefore, Alice and Eve set their own 6-bit error flags at the next bit time, in accordance with ISO 11898-1.

Bob receives 18 consecutive dominant bits from the Can bus.

Alice and Eve receive 12 consecutive dominant bits from the Can bus.

Example 6—CRC Delimiter Error in a Classical CAN Network

Reference is made to FIG. 13 indicating the bits sent by each node to the CAN bus via their TXD path and received from the CAN bus via their RXD path.

In this example, Bob has received a dominant CRC delimiter (which is a form error) bit due to a distortion. In response, Bob sends a 6-bit error flag starting at the next bit time according to ISO 11898-1.

Alice and Eve receive ACK-Del from the CAN bus as a dominant bit, which they would expect to receive as a recessive bit under normal operation. As a result, they send their own 6-bit error flag to the CAN bus beginning at the next bit time, EOF-1.

Bob receives 14 consecutive dominant bits from the Can bus.

Alice and Eve receive 8 consecutive dominant bits from the Can bus.

Example 7—CRC Delimiter Error in a CAN FD Network

Reference is made to FIG. 14 indicating the bits sent by each node to the CAN bus via their TXD path and received from the CAN bus via their RXD path.

In this example, Bob has received a dominant CRC delimiter bit (which is a form error) due to a distortion. In response, Bob sends a 6-bit error flag starting at the next bit time according to ISO 11898-1.

Alice and Eve see a dominant bit after ACK and thus insert an ACK 2 bit in their decoding process. Alice and Eve then receive ACK Del as dominant which they would expect to receive as a recessive bit under normal operation. As a result, they send their own 6-bit error flag to the CAN bus beginning at the next bit time, EOF-1.

Bob receives 15 consecutive dominant bits from the Can bus.

Alice and Eve receive 9 consecutive dominant bits from the Can bus.

Figure 5:
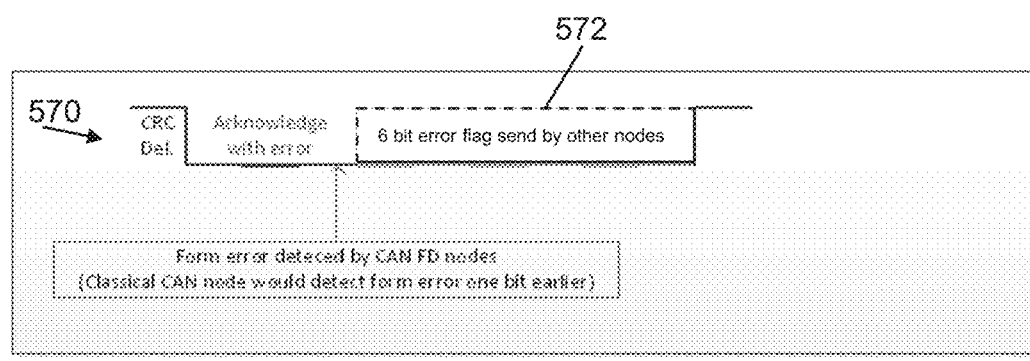
FIG. 5 illustrates examples of standard error handling of form errors in CAN networks.
Figure 5:
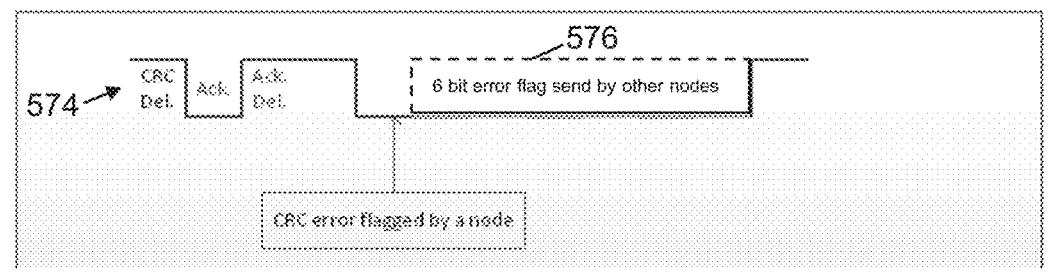

FIG. 5 provides further illustration of standard error handling of form errors in CAN networks. The upper illustration shows a bit sequence 570 present on a CAN bus in which one node has detected a form error due to missing recessive ACK delimiter and set a 6-bit error flag during ACK. The other nodes respond by setting a 6-bit error flag 572 beginning after receiving a dominant ACK Del bit. For a CAN FD network, the other CAN nodes see 9 consecutive dominant bits on the CAN bus (8 consecutive bits for Classical CAN).

The lower illustration shows a bit sequence 574 present on a CAN bus in which one CAN node has detected a CRC error. The node flags the error as a 6-bit error flag beginning after the ACK delimiter bit. The other nodes respond at the next bit time with their own 6-bit error flag 576. All nodes see 7 consecutive dominant bits on the CAN bus. This illustration corresponds to examples 1 and 2 above.

The above examples illustrate that under standard error handling procedures, CAN nodes in either a Classical CAN network or a CAN FD network can receive consecutive dominant bit sequences of length 7, 12 or 18 bits. CAN nodes in a Classical CAN network can additionally receive 8 or 14 consecutive dominant bits from the CAN bus. CAN nodes in a CAN FD network can additionally receive 9 or 15 consecutive dominant bits from the CAN bus.

In standard error handling procedures, CAN nodes in either a Classical CAN network or a CAN FD network only flag errors as a 6-bit error flag, according to ISO 11898-1. Therefore, even though CAN nodes may receive consecutive dominant bit sequences of 7, 8, 9, 12, 14, 15 or 18 bits, CAN nodes are only configured to set 6-bit error flags. As a result, certain lengths (for example, 10, 11, 13) of consecutive dominant bits cannot exist on the CAN bus (and be received by the CAN nodes) after the CRC delimiter under standard error handling procedures. It is these particular lengths and position that can be used to define the predetermined plurality of consecutive dominant bits of the present disclosure that identifies a security error.

Figure 6:
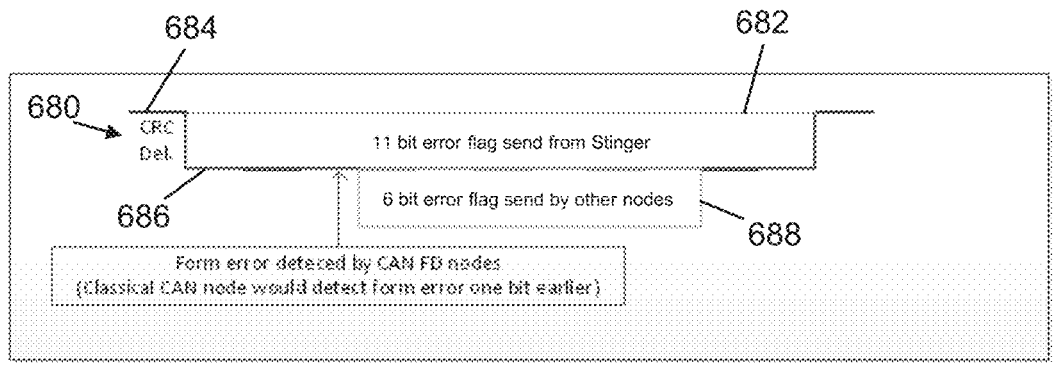
FIG. 6 illustrates a security error flagged by a security module according to an embodiment of the present disclosure.

FIG. 6 illustrates a security error flagged by a security module according to an embodiment of the present disclosure. The figure illustrates a bit sequence 680 present on a CAN bus in which a security module of a CAN node has detected a spoof attack by matching an identifier of a CAN message to a local identifier associated with the CAN node. In response to the identifier match, the security module has output an error signal to the CAN bus by setting a predetermined plurality of consecutive bits 682 to a dominant value. The predetermined plurality of consecutive bits 682 identifies a security error to CAN nodes connected to the CAN bus.

To identify a security error to CAN nodes, the security module flags an error on the CAN bus by setting a predetermined plurality of consecutive dominant bits 682 of a length that is different to any of the lengths of consecutive dominant bits that can occur on the CAN bus due to form error. The predetermined plurality of consecutive dominant bits 682 is at least 10 consecutive bits. In this example, the predetermined plurality of consecutive bits 682 is 11 consecutive bits. In other examples, the predetermined plurality of consecutive dominant bits 682 may be 10 consecutive bits or 13 consecutive bits. Lengths of 10, 11 or 13 consecutive bits are compatible with both Classical CAN and CAN FD networks. In a Classical CAN network, the predetermined plurality of consecutive dominant bits may also be 15 consecutive bits. In a CAN FD network, the predetermined plurality of consecutive bits may also be 14 consecutive bits.

As disclosed herein, the term "predetermined" means that the length of the plurality of consecutive dominant bits that identifies a security error to a CAN node is (pre)determined prior to an operation of the CAN network. In this way, the nodes of the CAN network know that a sequence of consecutive dominant bits equal to the predetermined length, such as 11 consecutive dominant bits, identifies a security error.

In some examples, the predetermined plurality of consecutive bits 682 is not a number that can be indicative of a form error. As explained in relation to the examples above, such excluded numbers can include 12, 14, 15 or 18 consecutive bits. As a result, CAN nodes would be unable to distinguish between a security error and a form error.

In other examples, the predetermined plurality of consecutive bits 682 may be 16 consecutive bits, 17 consecutive bits, 19 consecutive bits or more than 19 consecutive bits. Alternatively, the predetermined plurality of consecutive bits 682 may be less than 14 consecutive bits to avoid receiving nodes increasing their error counters multiple times (which may be referred to as an undesirable multiple-error interpretation).

A plurality of 11 consecutive bits and a plurality of 13 consecutive bits both have the advantage of being applicable to both Classical CAN and CAN FD nodes and avoiding the multiple-error interpretation effect.

In some examples, particularly examples where the predetermined plurality of consecutive bits 682 is 11 or 13 bits, a first bit of the predetermined plurality of consecutive bits 682 occurs after a CRC delimiter bit 684 of the CAN message. The first bit may correspond to an acknowledge bit 686 of the CAN message. If the predetermined plurality of consecutive bits 682 is greater than 13 bits, then the first bit of the predetermined plurality of consecutive bits 682 may be before CRC delimiter bit 684.

In the illustrated CAN FD example, the other CAN nodes in the CAN network detect a dominant ACK del bit and determine a form error. In response, the other CAN nodes flag a 6-bit error flag 688 in accordance with ISO 11898-1. However, due to the length of the predetermined plurality of consecutive bits 682 being at least 10 bits, the CAN bus remains dominant for some bits after the 6-bit error flag 688. In this way, the nodes on the CAN bus determine that the predetermined plurality of consecutive bits 682 identifies a security error and that the CAN network is under attack.

The security module's predetermined 11-bit error flag 682 lasts longer than the reactive 6-bit error flags 688 of the other CAN nodes and as a result the security error 682 can be clearly distinguished from other error flagging sources.

The following example describes the operation of a security module, in the three node CAN network used in the examples above, according to an embodiment of the present disclosure. The scenario considers the three CAN nodes Alice, Bob and Eve communicating over the same CAN network, however in this example Eve is a malicious node attempting to spoof Alice's identifier.

Reference is made to FIG. 15 indicating the bits sent by each node to the CAN bus via their TXD path and received from the CAN bus via their RXD path.

In this example, malicious CAN node Eve sends a CAN message with an identifier that is assigned to Alice. The security module of Legitimate CAN node Alice receives the CAN message and compares the identifier of the CAN message with a local identifier associated with CAN node Alice. Upon detecting a match between the two, Alice's security module outputs an error to the CAN bus by setting a plurality of 11 consecutive bits to a dominant value starting with the ACK bit.

Bob and Eve receive a dominant ACK Del which they would expect to receive as a recessive bit under normal operation. As a result, they send a 6-bit form error flag to the CAN bus beginning at the next bit time, EOF-1, according to ISO 11898-1. The 6-bit error flags end at EOF-6, yet the CAN bus remains dominant until the end of Alice's 11-bit security error flag. Each node can identify that a security attack has occurred by detecting the predetermined plurality of 11 consecutive dominant bits.

Returning to FIGS. 4A and 4B, the security module 460 is configured to pass received CAN messages to the local controller 410. The local controller 410 may wait until it has received an entire CAN message before attempting to decode or process it, or it may process it on an ongoing basis.

According to an embodiment of the present disclosure, the local controller 410 is configured to determine the validity of a received CAN message based on the presence of consecutive dominant bits in the received CAN message. In particular, the CAN node 402 can determine that a received CAN message is invalid due to a security attack (or spoof attack) if a number of consecutive dominant bits in the received CAN message is equal to the number of consecutive bits in the predetermined plurality of consecutive bits. This will occur if any CAN node connected to the CAN bus 404 has identified a security attack by setting a predetermined plurality of consecutive bits on the CAN bus 404 to a dominant value. The CAN node 402 can also determine that a received CAN message is invalid due to a non-security error, such as a form error, if the number of consecutive dominant bits in the CAN message is not equal to the predetermined number of consecutive bits that is associated with a security error. In some examples the microcontroller of a CAN node, or other dedicated hardware, can distinguish between a violation of a security policy and a non-security error.

The CAN node 402 may comprise a measurement module to measure a number or length of consecutive dominant bits in the received CAN message. In some examples, the measurement module may be a timer module or a capture and compare module of the local controller 410. The measurement module can measure the number of consecutive dominant bits in the CAN message by measuring a pulse length corresponding to a pulse defined by the consecutive dominant bits. The measurement module may measure the number of consecutive dominant bits for bits after the CRC delimiter bit of the CAN message. The measurement module may begin measuring the number of consecutive bits at a time after the CRC delimiter bit when data on the RXD path and the TXD path at the local controller are both dominant bits. This would correspond to RXD indicating that the CAN bus 404 is dominant and TXD sending a dominant ACK bit to the CAN bus 404.

This in turn indicates the correct point in time when an 11 bit error flag may be issued by one of the CAN nodes connected to the CAN bus 404.

Upon determination that the received CAN message is a malicious CAN message or that the CAN network is under attack, the local controller 410 may perform a number of additional operations:
1. The local controller may log the CAN message as a malicious message. The logged message may be accessed by the CAN node or a network operator for future analysis.

2. The local controller may alert or display an error to a network operator that the CAN network is under attack. The network operator may take appropriate remedial action such as shutting down the CAN network, enabling a safety mode of one or more nodes in the network and/or identifying and isolating the source of the attack.
3. The local controller may put its CAN node into an emergency mode or safe mode. This may include disabling, limiting or denying access to certain features.
4. The local controller may automatically send a message to one or more other CAN nodes or the whole CAN network. The message may alert the CAN nodes or network to the attack and/or put one or more CAN nodes into an emergency mode The above actions may be performed by any local controllers of the CAN nodes connected to the CAN bus because each CAN node can identify the predetermined plurality of consecutive dominant bits as a security attack.

The disclosed system and method provide CAN nodes and/or a CAN network owner with means to distinguish whether a CAN frame has been invalidated due to a security policy violation or by a non-security disturbance (e.g. from a glitch or a RF energy injection). This is achieved by a proper timing of the error signal, wherein the error signal comprises at least 10 consecutive dominant bits.

The security module transceiver can start the error signal after the CRC delimiter bit of the malicious message and the error signal lasts more than 9 bits or at least 10 bits. Advantageously it can have a length of 11 bits or 13 bits. This can provide a unique position and length of the security error signal, which can be observed and differentiated from other (non-security related) error signalling by CAN nodes connected to the CAN bus.

Figure 7:
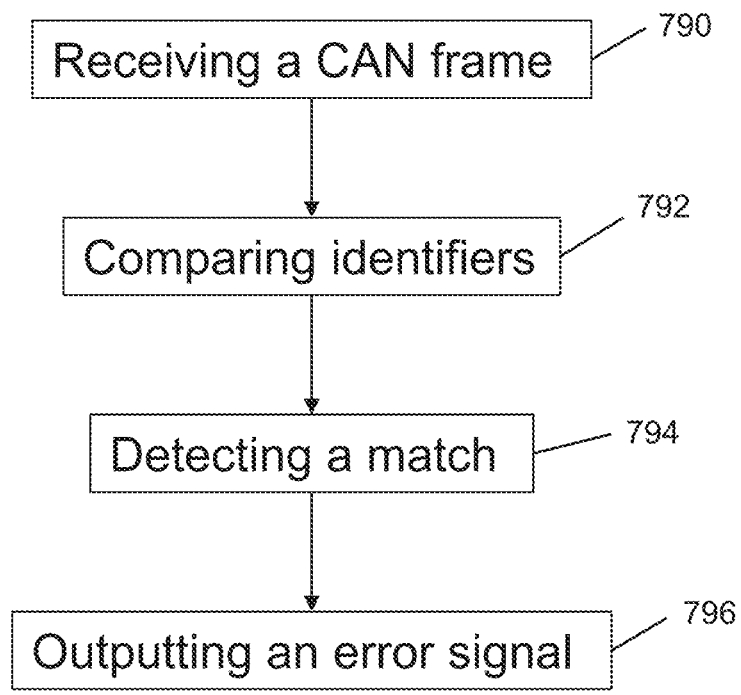
FIG. 7 illustrates an example embodiment of a method of outputting an error signal to a controller area network, CAN, bus

FIG. 7 illustrates an example embodiment of a method of outputting an error signal to a controller area network, CAN, bus. As discussed throughout this document, the method may output the error signal in response to an attack.

At step 790, the method involves receiving a CAN frame from the CAN bus. The method can involve determining whether or not the received message was sent from the local host or not. If the message was sent by the local host/node, then it may apply different or additional conditions than would be the case if the message had been received by a remote host/node. For instance, one or more policies may only be checked to see if they have been violated for a remotely received message that has the identifier of the local host/node.

At step 792, the method includes comparing an identifier of the received CAN frame with at least one identifier associated with a local controller. At step 794, the method comprises detecting a match between the identifier of the received CAN frame and the at least one identifier associated with the local controller. As discussed above, such a match is indicative of a third party trying to spoof a message associated with the CAN node of the local controller.

At step 796, the method includes outputting an error signal to the CAN bus by setting a predetermined plurality of consecutive bits in the CAN frame to a dominant value. As discussed above, the predetermined plurality of consecutive bits identifies a security error to CAN nodes connected to the CAN bus and is at least 10 consecutive bits.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A security module for a controller area network, CAN, node the security module comprising:
  a receive data, RXD, input interface for receiving data from a CAN bus;
  a transmit data, TXD, output interface for transmitting data to the CAN bus;
  wherein the security module is configured to:
    receive a CAN frame from the CAN bus via the RXD input interface;

compare an identifier of the received CAN frame with at least one identifier associated with a local controller; and upon detection of a match between the identifier of the received CAN frame and the at least one identifier associated with the local controller, output an error signal to the CAN bus via the TXD output interface by setting a predetermined plurality of consecutive bits in the CAN frame to a dominant value, wherein the predetermined plurality of consecutive bits identifies a security error to CAN nodes connected to the CAN bus and is at least 10 consecutive bits.

2. The security module of claim 1, wherein the predetermined plurality of consecutive bits identifies a security error to CAN nodes connected to the CAN bus by having a length different to any length of consecutive dominant bits that can arise on the CAN bus due to a form error.

3. The security module of claim 1, wherein the predetermined plurality of consecutive bits is at most 15 consecutive bits.

4. The security module of claim 1, wherein the predetermined plurality of consecutive bits is one of:
10 consecutive bits;
11 consecutive bits; or
13 consecutive bits.

5. The security module of claim 1, wherein the predetermined plurality of consecutive bits is one of:
16 consecutive bits;
17 consecutive bits;
19 consecutive bits; or
more than 19 consecutive bits.

6. The security module of claim 1, wherein the security module is configured to set the predetermined plurality of consecutive bits such that a first of the predetermined plurality of consecutive bits occurs after a CRC delimiter bit of the received CAN frame.

7. The security module of claim 1, wherein the security module is configured to set the predetermined plurality of consecutive bits such that a first of the predetermined plurality of consecutive bits corresponds to an acknowledge bit of the received CAN frame.

8. A CAN node comprising:
a CAN transceiver;
the local controller; and
a security module comprising:
    a receive data, RXD, input interface for receiving data from a CAN bus;
    a transmit data, TXD, output interface for transmitting data to the CAN bus;
wherein the security module is configured to:
    receive a CAN frame from the CAN bus via the RXD input interface;
    compare an identifier of the received CAN frame with at least one identifier associated with a local controller; and
    upon detection of a match between the identifier of the received CAN frame and the at least one identifier associated with the local controller, output an error signal to the CAN bus via the TXD output interface by setting a predetermined plurality of consecutive bits in the CAN frame to a dominant value, wherein the predetermined plurality of consecutive bits identifies a security error to CAN nodes connected to the CAN bus and is at least 10 consecutive bits, wherein:
    the RXD input interface and TXD output interface of the security module are configured to communicate with the CAN bus via the CAN transceiver, and
    the security module is located on a data path between the CAN transceiver and the local controller.

9. The CAN node of claim 8, wherein the predetermined plurality of consecutive bits identifies a security error to CAN nodes connected to the CAN bus by having a length different to any length of consecutive dominant bits that can arise on the CAN bus due to a form error.

10. The CAN node of claim 8, wherein the predetermined plurality of consecutive bits is one of:
10 consecutive bits;
11 consecutive bits; or
13 consecutive bits.

11. The CAN node of claim 8, wherein the security module is configured to set the predetermined plurality of consecutive bits such that a first of the predetermined plurality of consecutive bits corresponds to an acknowledge bit of the received CAN frame.

12. The CAN node of claim 8, wherein:
the security module is configured to pass through the received CAN frame to the local CAN controller, and
the local CAN controller is configured to determine the validity of the received CAN frame based on consecutive dominant bits in the received CAN frame.

13. The CAN node of claim 12, wherein the CAN node is configured to determine that the received CAN frame is invalid due to:
a violation of a security policy if a number of consecutive dominant bits in the received CAN frame is equal to the predetermined number of consecutive bits in the plurality of consecutive bits; or
a non-security error if the number of consecutive dominant bits in the received CAN frame is not equal to the predetermined number of consecutive bits in the plurality of consecutive bits.

14. The CAN node of claim 8, wherein the CAN node comprises a measurement module configured to measure the number of consecutive dominant bits in the CAN frame.

15. The CAN node of claim 14, wherein the measurement module comprises:
a timer module; or
a capture and compare module.

16. The CAN node of claim 14, wherein the measurement module is configured to measure the number of consecutive dominant bits in the CAN frame by measuring a pulse length corresponding to a pulse defined by the consecutive dominant bits.

17. The CAN node of claim 14, wherein the measurement module is configured to start measuring a pulse length when a signal level on the TXD output interface and a signal level on the RXD input interface are both dominant.

18. A method for outputting an error signal to a controller area network, CAN, bus, the method comprising:
receiving a CAN frame from the CAN bus;
comparing an identifier of the received CAN frame with at least one identifier associated with a local controller;
detecting a match between the identifier of the received CAN frame and the at least one identifier associated with the local controller; and
outputting an error signal to the CAN bus by setting a predetermined plurality of consecutive bits in the CAN frame to a dominant value, wherein the predetermined plurality of consecutive bits identifies a security error to CAN nodes connected to the CAN bus and is at least 10 consecutive bits.

19. The method of claim 18, wherein the predetermined plurality of consecutive bits identifies a security error to CAN nodes connected to the CAN bus by having a length different to any length of consecutive dominant bits that can arise on the CAN bus due to a form error.

20. The method of claim 18, wherein the predetermined plurality of consecutive bits is one of:
   10 consecutive bits;
   11 consecutive bits; or
   13 consecutive bits.

\* \* \* \* \*